C. C. MOORE.
Pulleys.

No. 135,722.    Patented Feb. 11, 1873.

Witnesses:
Chas. Nida
Alex F. Roberts

Inventor:
C. C. Moore
Per
Munn
Attorneys

UNITED STATES PATENT OFFICE.

CHARLES C. MOORE, OF NEW YORK, N. Y.

IMPROVEMENT IN PULLEYS.

Specification forming part of Letters Patent No. 135,722, dated February 11, 1873.

*To all whom it may concern:*

Figure 1:
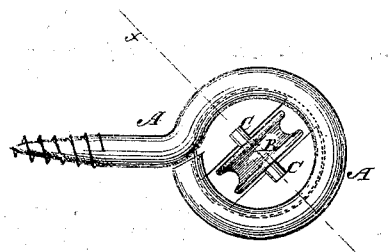
Figure 2:
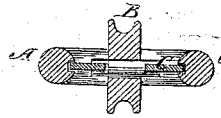

Be it known that I, CHARLES C. MOORE, of the city, county, and State of New York, have invented a new and useful Improvement in Adjustable Pulley or Wheel, of which the following is a specification:

Figure 1 represents my improved pulley. Fig. 2 is a detail section of the same taken through the line $x$ $x$, Fig. 1.

Similar letters of reference indicate corresponding parts.

The invention consists in a new mode of making a pulley or wheel adjustable in a circular direction, as hereinafter fully described.

A represents a screw-eye, in the inner side of the eye or ring of which is formed a groove, as shown in Fig. 2, and in dotted lines in Fig. 1. B is the pulley or wheel, which revolves upon an axle, C, the ends of which are made in the form of, or are attached to, segments of circles, the curved edges of which fit into the groove in the eye A, as shown in Figs. 1 and 2. By this construction the pulley B may be turned in any desired direction by moving the ends of its axle C in the groove of the eye A. The screw-eye may also be turned in its support, so that the cord passing around said pulley may be led in any desired direction. The cord may also be passed through the eye A as well as around the pulley B, so that should the pulley-axle by any chance give way the cord may be received and held by the eye A.

The shank of the eye A may be made in the form of a spike instead of a screw, if preferred, or practicable for the location in which the device is to be used.

Having thus described my invention, I claim as new and desire to secure by Letters Patent—

As an article of manufacture, a pulley or wheel revolving upon an axis, C, movable in the curved groove in the eye A, as and for the purpose set forth.

CHARLES C. MOORE.

Witnesses:
T. B. MOSHER,
ALEX. F. ROBERTS.